July 13, 1943.  P. N. BOSSART  2,324,059
ELECTRICAL NETWORK APPARATUS
Filed Jan. 30, 1942

INVENTOR.
Paul N. Bossart.
BY
HIS ATTORNEY.

Patented July 13, 1943

2,324,059

UNITED STATES PATENT OFFICE 2,324,059

ELECTRICAL NETWORK APPARATUS

Paul N. Bossart, Cheswick, Pa., assignor to The Union Switch & Signal Company, Swissvale, Pa., a corporation of Pennsylvania Application January 30, 1942, Serial No. 428,893

11 Claims. (Cl. 246—8)

My invention relates to electrical network apparatus, and it has particular reference to the provision of novel and improved apparatus for use in networks, and to the organization of such apparatus into novel and improved forms of electrical networks. More particularly, my invention relates to electrical networks incorporating apparatus for directing alternating or periodically varying energy through predetermined paths in such networks.

An object of my invention is to organize apparatus into novel and improved forms of electrical networks arranged to direct alternating current energy through a conductor from either one of a pair of multiple connected paths while substantially preventing energy from flowing from such one path through the other of the paths.

Another object is to provide novel and improved electrical networks of the type adapted for use in train communication systems.

A further object is the provision of novel and improved reactors for use in directing alternating current energy through predetermined paths in an electrical network.

An additional object is to provide novel and improved reactance devices.

In practicing my invention, the above-mentioned and other important objects and characteristic features which will become readily apparent from the following description, are attained in accordance with the invention by providing, at the junction of a pair of conductors connected in multiple through a common conductor, a reactance device comprising a magnetizable core having means for connecting each of the pair of conductors to the common conductor through paths each including windings mounted on the core and wound in opposite directions, and for connecting the pair of conductors together through a path or paths which include windings wound in the same direction. Alternating or periodically varying current in the oppositely wound windings, flowing from either of the pair of conductors through the common conductor, creates opposing fluxes which tend to cancel each other and lower the reactance of such windings to permit readily the transfer of energy through such windings, whereas current tending to flow from either of the pair of conductors through the other of such pair creates a unidirectional flux and such path presents a high impedance to the flow of current from either of the conductors to the other of such pair of conductors.

I shall describe several forms of apparatus embodying my invention, and shall then point out the novel features thereof in claims.

Figure 1:
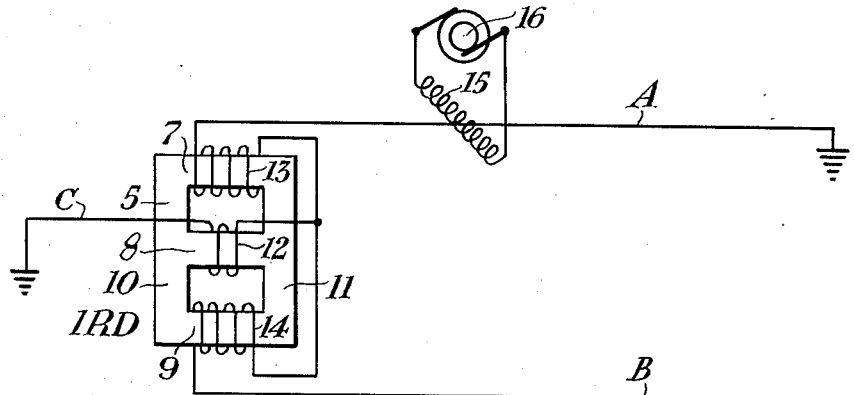
Figure 2:
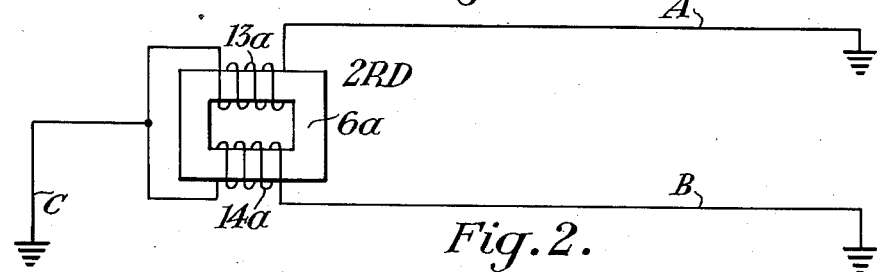
Figure 3:
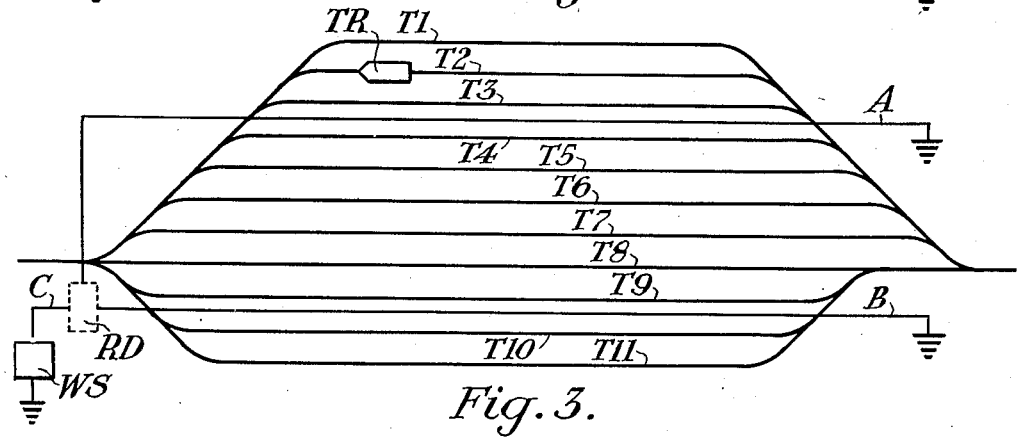
Figure 4:
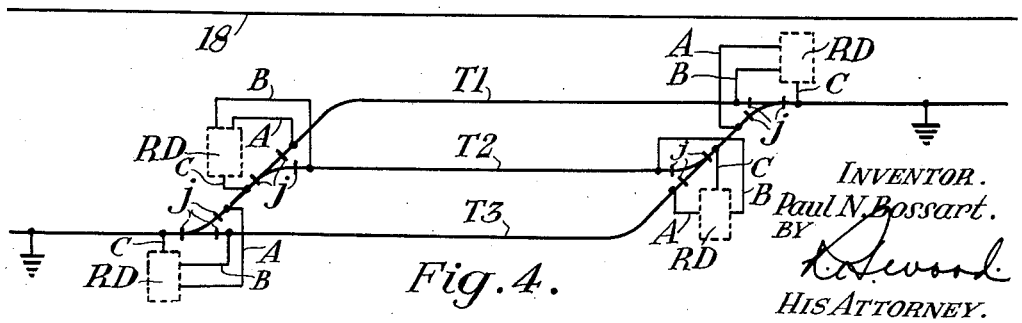

In the accompanying drawing, Fig. 1 is a diagrammatic view illustrating one form of apparatus embodying my invention. Fig. 2 is a diagrammatic view representing a modification of the apparatus illustrated in Fig. 1, and also embodying my invention. Figs. 3 and 4 are each diagrammatic views representing applications of the network apparatus embodying my invention and illustrated in Figs. 1 and 2. In each of the several views, similar reference characters have been employed to designate corresponding parts.

Referring to the drawing, the reference characters A and B designate a pair of conductors connected, in multiple, to a single common conductor C. The conductors A, B and C comprise an electrical network and are connected in a closed electrical circuit in any suitable manner, such as, for example, by connecting each of the conductors to another conductor, which may as represented comprise a ground or earth path. Incorporated into such a network is a reactance device, designated by the reference character RD with a suitably distinguishing prefix, for directing alternating or periodically varying energy from either of the pair of conductors A and B through the common conductor C, while substantially blocking the flow of such energy from either of the pair of conductors to the other conductor of such pair. The reactance device RD comprises a magnetizable core which may be either of the three-legged type, such as core 5 represented in Fig. 1, or of the shell type, such as core 6a illustrated in Fig. 2.

In one form of the reactance device, designated in Fig. 1 by the reference character 1RD, the core comprises a three-legged structure 5, having individual legs 7, 8 and 9 connected together by bridging members 10 and 11, respectively. In such a construction, two independent magnetic circuits are available, one comprising outer leg 7, intermediate leg 8 and the adjoining portions of the bridging members 10 and 11, while the other magnetic circuit comprises the other outer leg 9, intermediate leg 8 and the adjoining portions of members 10 and 11. A winding 12 is disposed on leg 8 common to the two circuits, while two other windings 13 and 14 are disposed one on each of the two magnetic circuits respectively. The two windings 13 and 14 are wound in the same direction and are connected together so that current flowing through the two windings in series creates additive fluxes, whereas the other winding 12 is wound in opposition to the two windings and is connected in circuit at a point between the two windings so that current flowing through either of the two windings and then through winding 12 in series creates opposing fluxes. Preferably, each winding 13 and 14 is comprised of twice the number of turns of winding 12.

The device RD when incorporated into an electrical network functions to direct energy through predetermined paths. Thus, for example, when conductor A is connected to winding 13, conductor B is connected to winding 14, and conductor C is connected to winding 12, the device functions to direct the flow of alternating current energy from either conductor A or B through conductor C while substantially blocking the flow of energy from either conductor A or B through the other of such two conductors. This results from the fact that if an alternating electromotive force is impressed on either of the two conductors A and B, current is caused to flow in a circuit comprising such conductor, conductor C and the ground return path, but such current is substantially blocked from flowing through the alternate circuit comprising the two conductors A and B and the ground path, due to the differences in the relative reactances of the paths provided by the reactance device IRD. Should an alternating electromotive force be impressed on conductor A, for example, as by induction from a coil 15 connected to a suitable source of alternating current 16, the potential induced in conductor A causes current to flow through windings 13 and 12 in series, and the opposing fluxes created by this current tend to neutralize each other. As a result, therefore, there will be a relatively low net inductive reactance in this path and its impedance will be quite low. The path connecting together the two conductors A and B will have a relatively high inductive reactance since any current in such path, flowing through the two windings 13 and 14 in series, will create additive fluxes, hence the impedance of this path will be relatively high. It is, of course, obvious that if an alternating electromotive force is impressed on conductor B, the windings 13 and 14 connecting together conductors A and B will present a relatively high impedance to the flow of current whereas current in the windings 14 and 12, connecting conductor B to conductor C, will create opposing fluxes which tend to neutralize each other and as a result such windings will have a relatively low impedance.

Results obtained by actual experiment with a reactance device constructed as represented in Fig. 1, prove that the ratio of impedance of path A—B (or B—A) to path A—C through the device is 5.5 to 1. If, however, the conductors A and B are joined in parallel externally, the impedance to C substantially disappears, being about 1% of the impedance from A to B through the reactor. In practice, when alternating current energy is applied to one of a pair of multiple connected conductors grounded at one end and connected together at their other ends through a device IRD, leakage from the one conductor through the ground to the other conductor might cause such other conductor to carry current in a direction depending upon relative ground and conductor impedances; and the components of such current in the other conductor which aid in parallel the current flow from the one conductor to the common conductor, will readily pass through the device IRD to the common conductor and greatly reduce its impedance in the desired direction.

In an alternative form of the reactance device, designated in Fig. 2 by the reference character 2RD, windings 13a and 14a connected in series are mounted on a closed core 6a. Conductors A and B are connected to windings 13a and 14a respectively, while conductor C is connected to the circuit connection of the windings at a point intermediate the windings. The windings are arranged so that when energized in series, as by current flowing from either conductor A or B through the windings to the other conductor, the windings cooperate in circulating flux in agreement in core 6a.

The windings 13a and 14a each have an equal number of turns, hence when an alternating electromotive force is impressed on either of the two conductors as by induction from winding 15 shown in Fig. 1, the major portion of such current is caused to flow through conductor C, due to the relative impedances of the paths through the conductor. In a device such as is represented in Fig. 2, the ratio of impedance of path A—B (or B—A) to path A—C through the device is 4 to 1. The reactance device IRD illustrated in Fig. 1 is, therefore, preferred for use in an electrical network, because of the greater differentiation in impedance of the paths through the reactor.

In a network including a reactance device constructed in accordance with the invention, it is of course readily apparent that the low impedance paths are provided through such a device from the common conductor C to either of the two parallel conductors A and B. Such a device accordingly may be considered as exhibiting asymmetrical directing properties in that an energy flow from either of the parallel conductors is directed through the common conductor and blocked from the other parallel conductor, whereas an energy flow from the common conductor is provided with paths of substantially equal and quite low impedance to each of the two parallel conductors.

Electrical networks exhibiting energy directing properties of the type described have a widespread utility, and are particularly useful, for example, in train communication systems arranged to establish communication between a train and a wayside office or between two trains. A network of the type hereinbefore described may be employed, for example, in a communication system provided for a classification yard comprising a plurality of interconnected tracks. Such an application is represented in Fig. 3, wherein the conductors A and B are disposed for inductive relation with energy transmitting and/or receiving apparatus carried on a train operating on any one of the plurality of tracks, each of which tracks is designated by the reference character T with a suitably distinguishing suffix. The conductors A and B are connected through a reactance device RD of the type hereinbefore described, to a common conductor C which extends to the wayside office equipment, and the conductors A, B and C are all interconnected through a ground or earth path as indicated in the drawing.

The train communication system represented in Fig. 3 is of the type wherein line wires are utilized as communication channels. One such system of this type, for example, is described in detail and covered in Letters Patent of the United States No. 2,064,640 granted to me on December 15, 1936, and comprising train-carried communication apparatus operative to inductively transmit current to and/or receive current from a line wire adjacent to the equipment, and wayside equipment operative also to transmit to and receive current from such line wire. This type of equipment is well known and it is deemed sufficient for the present description to state that when common conductor C is coupled to wayside apparatus, designated by the reference character WS, of the type described in my aforesaid patent, and a train, designated by the reference character TR, in the yard is provided with train-carried equipment of the type also described in my patent, energy transmitted from the train is directed through the line wire network to the wayside apparatus. Where, as represented in Fig. 3, the communication system is employed for an extensive yard layout requiring more than a single line wire for effectively transmitting energy from all points of the yard to the wayside station, there is the possibility that energy impressed on one of the line wires might flow in circuit through another of such line wires and ground back to the one line wire and thus be shunted from the common conductor C coupled with the wayside apparatus, thereby effectively preventing communication between the train and office. This possibility is obviated in accordance with the present invention by incorporating into such a network a reactance device RD at the junction of each two parallel conductors which are continued on as a single or common conductor, thus preventing energy from being shunted through a parallel connected conductor away from the common conductor coupled with the wayside communication apparatus.

The electrical network apparatus may also be employed in connection with communication systems of the class wherein the track rails are utilized as the transmission channels, and a line wire, designated by the reference character 18, is employed as an auxiliary channel. In such a system, the track rails themselves may be connected in a network incorporating a reactance device or devices RD of the present invention, and one such arrangement is represented in Fig. 4 wherein the rails of tracks T1, T2 and T3 are incorporated into an electrical network including a reactance device RD at the junction of each two tracks. These reactance devices, as can be seen from an inspection of the drawing, are arranged so as to enable an energy transfer to take place between either of two tracks to the adjoining single or common track, while effectively preventing an energy transfer from either of the two tracks through the other of the tracks. The arrangement involves the use of insulated joints *j* in each of the three tracks, and which insulated joints are bridged by employing a reactance device RD and connecting the device in a manner believed to be obvious from an inspection of the drawing.

The arrangement represented in Fig. 4 may be employed with a track layout wherein either or both of the track rails of each track are employed as transmission conductors. In case both track rails are employed, two reactance devices RD will be necessary at each junction of two tracks, whereas when only one track rail is employed as a transmission conductor, only one reactance device may be employed, as indicated in the line diagram of Fig. 4, at each track junction. In this latter case, the track rails not employed for transmission conductors will of course be insulated from connection with all other tracks of the layout, as is the usual practice.

The network arrangement represented in Fig. 4 will of course function to direct alternating current energy through predetermined paths in the manner described in detail hereinbefore, whereby energy from either of a pair of multiple connected conductors may be directed through a common conductor and be prevented from flowing through the other of the multiple connected conductors. This feature facilitates greatly the transmission of communication energy in railway communication systems, particularly in territories such as classification yards where a plurality of paths in multiple are available for the transmission of energy.

Although I have herein shown and described only a few forms of electrical network apparatus embodying my invention, it is understood that various changes and modifications may be made therein within the scope of the appended claims without departing from the spirit and scope of my invention.

Having thus described my invention, what I claim is:

1. A reactance device for directing alternating current energy through predetermined paths in an electrical network comprising a pair of conductors connected in multiple to a common conductor, said means comprising a magnetizable core provided with two magnetic circuits both linked by a first winding connected to said common conductor, and two other windings one disposed on one magnetic circuit and the other winding disposed on the other magnetic circuit, said two other windings being connected in series in additive relation and being connected one winding to one of said pair of conductors and the other winding to the other of said pair of conductors, said first winding having a connection to the series connection of said two windings at a point intermediate the windings, and being arranged in opposing relation to each of said two other windings whereby current flowing through either of said two windings and then through said first winding sets up opposing fluxes.

2. A reactance device for directing alternating current energy through predetermined paths in an electrical network comprising a pair of conductors connected in multiple to a common conductor, said means comprising a magnetizable core provided with two magnetic circuits both linked by a first winding connected to said common conductor, and two other windings one disposed on one magnetic circuit and the other winding disposed on the other magnetic circuit, said two other windings being connected in series in additive relation and being connected one winding to one of said pair of conductors and the other winding to the other of said pair of conductors, said two other windings having an equal number of turns and said first winding having one-half the number of turns of either of said two other windings, said first winding having a connection to the series connection of said two windings at a point intermediate the windings, and being arranged in opposing relation to each of said two other windings whereby current flowing through either of said two windings and then through said first winding sets up opposing fluxes.

3. An electrical network comprising a pair of conductors and a common conductor each having a connection with a conducting path, and means for directing alternating current energy from either of said pair of conductors through said common conductor while blocking current flowing from either of said pair of conductors through the other, said means comprising a magnetizable core provided with windings one for each of said conductors, said windings being arranged on said core and interconnected so as to connect said pair of conductors together through a path including windings arranged in additive relation for creating additive fluxes and to connect each of said pair of conductors with said common conductor through a path comprising windings arranged in opposing relation for creating opposing fluxes.

4. An electrical network comprising a pair of conductors and a common conductor each having a connection with a conducting path, and means for directing periodically varying electrical energy from either of said pair of conductors through said common conductor while blocking current flowing from either of said pair of conductors through the other, said means comprising a magnetizable core provided with two magnetic circuits both linked by a first winding connected to said common conductor, and two other windings disposed one winding on one magnetic circuit and the other winding on the other magnetic circuit, said two other windings being connected in series in additive relation and being connected one winding to one of said pair of conductors and the other winding to the other of said pair of conductors, said first winding having a connection to the series connection of said two windings at a point intermediate the windings, and being arranged in opposing relation to each of said two other windings whereby current flowing through either of said two windings and then through said first winding sets up opposing fluxes.

5. An electrical network comprising a pair of conductors and a common conductor each having a connection with a conducting path, and means for directing alternating electrical energy from either of said pair of conductors through said common conductor while blocking current flowing from either of said pair of conductors through the other, said means comprising a magnetizable core provided with two magnetic circuits both linked by a first winding connected to said common conductor, and two other windings each having an equal number of turns disposed one winding on one magnetic circuit and the other winding on the other magnetic circuit, said two other windings being connected in series in additive relation and being connected one winding to one of said pair of conductors and the other winding to the other of said pair of conductors, said first winding having one-half the number of turns of either of said two windings and having a connection to the series connection of said two windings at a point intermediate the windings, and being arranged in opposing relation to each of said two other windings whereby current flowing through either of said two windings and then through said first winding sets up opposing fluxes.

6. An electrical network comprising a pair of conductors and a common conductor each having a connection with a conducting path, and means for directing alternating current energy from either of said pair of conductors through said common conductor while blocking current flowing from either of said pair through the other of said pair of conductors, said means comprising a magnetizable core having two magnetic circuits both linked by a first winding connected to said common conductor, and two other windings disposed on said core and connected in series, one of said two windings connected to one of said pair of conductors and disposed on one of said magnetic circuits and the other of said two windings connected to the other of said pair of conductors and disposed on the other of said magnetic circuits, said two windings being additively arranged for creating additive fluxes when current flows from either of said pair of conductors through the other of such pair, said first winding having half the turns of either of said two other windings and being connected to said two windings at a point intermediate the windings, said first winding being arranged in opposing relation to each of said two windings whereby current flowing from either one of said pair of conductors through said common conductor creates in the core opposing fluxes which thread the magnetic circuit associated with the one conductor from which current is flowing.

7. An electrical network comprising a pair of conductors and a common conductor each having a connection with a conducting path, and means for directing alternating energy from either of said pair of conductors through said common conductor while blocking the flow of current through said pair of conductors in series, said means comprising a magnetizable core provided with a winding connected through a mid terminal tap to said common conductor, one of said pair of conductors being connected with one terminal of said winding and the other of said pairs of conductors being connected to the other terminal of said winding, whereby energy impressed on either of said two conductors is caused to flow through the common conductor and is substantially blocked from flowing through the other of said two conductors, due to the relative differences in impedance of paths through said directing means.

8. In combination, a plurality of railway tracks, a train to travel said tracks, and means for assisting the transmission of information between said train and a wayside station, said means comprising an electrical network including two conductors disposed for inductive relation with a train-carried inductor on said tracks, a common conductor extending from said two conductors to said wayside station, said conductors each having a connection with a conducting path, and means for directing energy from either of said two conductors through said common conductor while blocking the flow of energy through said two conductors in series, said means comprising a magnetizable core provided with two windings one for each of said two conductors, said windings being arranged on said core for creating additive fluxes when current flows from either of said two conductors to the other, and a connection from said common conductor to said two windings at a point intermediate said windings.

9. In combination, a plurality of railway tracks, a train to travel said tracks, and means for assisting the transmission of information between said train and a wayside station, said means comprising two conductors disposed in inductive relation to said tracks, a common conductor extending to the wayside station, said conductors each having a connection with a conducting path, said means comprising a magnetizable core provided with two magnetic circuits both linked by a first winding connected to said common conductor, and two other windings one disposed on one magnetic circuit and the other winding disposed on the other magnetic circuit, said two other windings being connected in series in additive relation and being connected one winding to one of said pair of conductors and the other winding to the other of said pair of conductors, said first winding having a connection to the series connection of said two windings at a point intermediate the windings, and being arranged in opposing relation to each of said two other windings whereby current flowing through either of said two windings and then through said first winding sets up opposing fluxes.

10. In combination, a plurality of railway tracks, a train to travel said tracks, and means for assisting the transmission of information between said train and a wayside station, said means comprising two conductors disposed adjacent to said tracks in inductive relation with a train-carried inductor on said tracks, a common conductor extending to the wayside station, said conductors each having a connection with a conducting path, and means for directing energy from either of said pair of conductors through said common conductor while blocking the flow of current through said pair of conductors in series, said means comprising a magnetizable core provided with a winding having a mid terminal tap, said common conductor being connected to said mid terminal tap and said two conductors being connected to the outer terminals of said winding respectively.

11. In combination, a plurality of railway tracks, a train to travel said tracks, and means for assisting the transmission of information between said train and a wayside station, said means comprising two track rails, one for each of two different sets of tracks, and a common track rail extending from each of said two track rails to said wayside station, and means for directing alternating current energy from either of said two track rails through said common rail, said means comprising a magnetizable core provided with windings one for each track rail, said windings being arranged on said core and connected to said track rails in such manner as to couple each of said two track rails to said common rail through a low impedance path while coupling said two track rails in series through a high impedance path.

PAUL N. BOSSART.